United States Patent [19]

Kobayashi et al.

[11] Patent Number: 4,829,595
[45] Date of Patent: May 9, 1989

[54] AUTOMOBILE ELECTRONIC DEVICE

[75] Inventors: Shigetoshi Kobayashi; Terunobu Chiba, both of Tokyo, Japan

[73] Assignee: Clarion Co., Ltd., Tokyo, Japan

[21] Appl. No.: 72,450

[22] Filed: Jul. 13, 1987

[30] Foreign Application Priority Data

Jul. 17, 1986 [JP] Japan ............................ 61-108726[U]
Aug. 15, 1986 [JP] Japan ............................ 61-124637[U]

[51] Int. Cl.⁴ ........................ H04B 1/08; A47B 5/00
[52] U.S. Cl. .................................. 455/346; 455/348; 455/351; 312/71
[58] Field of Search ............... 455/345, 346, 347, 348, 455/351; 381/86, 88; 312/7.1, 7.2, 242, 246, 320

[56] References Cited

U.S. PATENT DOCUMENTS

| 2,071,398 | 2/1937 | Frantz et al. | 455/346 |
| 2,866,891 | 12/1958 | Princ | 455/346 X |
| 3,071,728 | 1/1963 | Grace et al. | 455/346 |
| 3,103,630 | 9/1963 | Pitts et al. | 455/346 |
| 3,134,945 | 5/1964 | Wertheimer | 455/346 |

FOREIGN PATENT DOCUMENTS

| 1209317 | 3/1960 | France | 455/346 |
| 2169763 | 7/1986 | United Kingdom | 455/348 |
| 8603080 | 5/1986 | World Int. Prop. O. | 455/346 |

OTHER PUBLICATIONS

"Comco Model 812 Portacom," Brochure 1/29/74.

Primary Examiner—Benedict V. Safourek
Assistant Examiner—Ralph E. Smith
Attorney, Agent, or Firm—Flynn, Thiel, Boutell & Tanis

[57] ABSTRACT

A car electronic device removably mounted in position of a car includes a pivotable handle which is used to mount the device in the car or transport outside the car. The handle may be held to a sitting position aligned with the front face of the device to show it as a continuous part of a fixed member of the device so as to not only improve the appearance of the front face of the device but also establish a psychological antitheft effect.

16 Claims, 7 Drawing Sheets

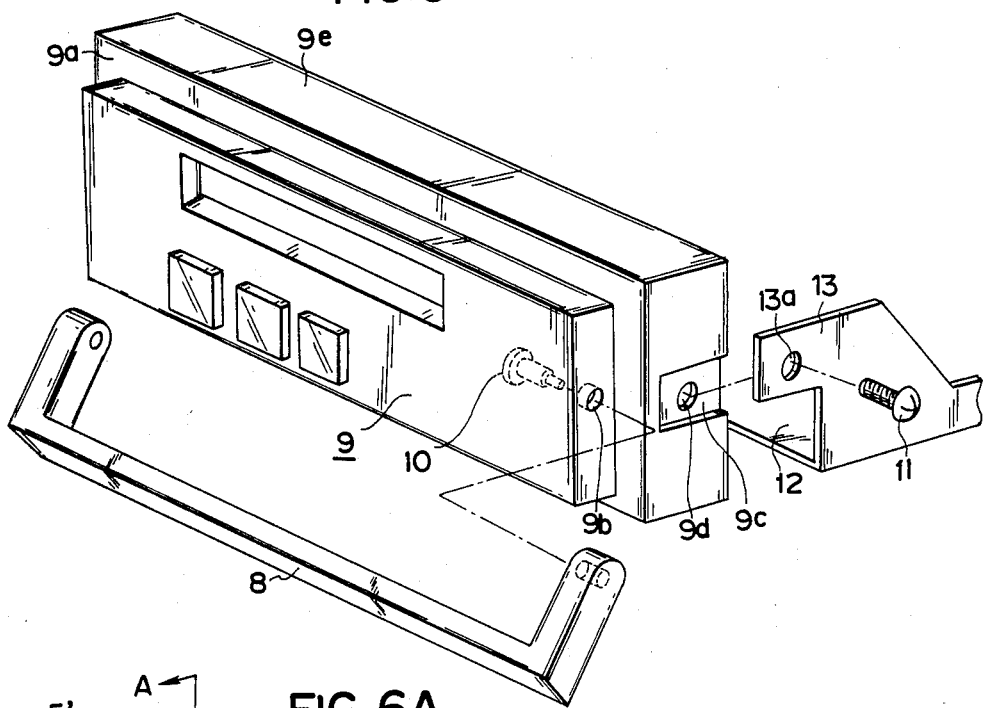
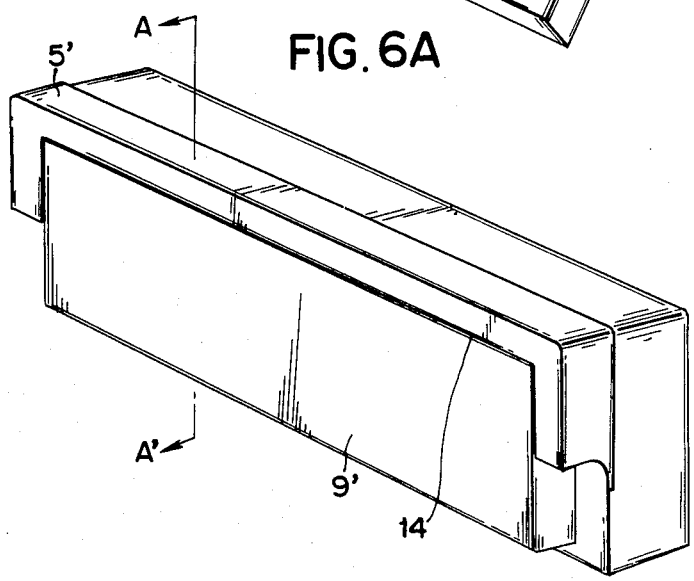
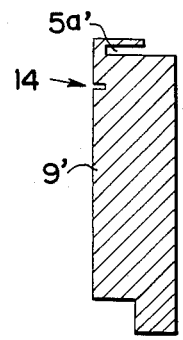

AUTOMOBILE ELECTRONIC DEVICE

FIELD OF THE INVENTION

This invention relates to a car electronic device releasably mounted in a car, and more particularly to a car electronic device having a carrying handle pivotably attached thereto.

BACKGROUND OF THE INVENTION

Along with an increase of bulgary of car electronic devices, there are used some arrangements which facilitate a user to readily remove a device from his car and bring it with him for the antitheft purpose when he leaves the car.

FIG. 10 shows such a prior art arrangement having a handle 31 attached to the front face of a car stereo or other car electronic device so as to facilitate a user to bring it with him. The handle 31 is made from a metal plate other than plastic resin which does not have a sufficient strength. The metal handle 31 is a single body member including a grip 31a for a parallel alignment with an operation panel 33 and arms 31b extending from opposite ends of the grip 31a. Distal ends of the arms 31b are pivotably supported on front, lateral surfaces of the device 30 by shafts 34. While the device is held in position of a car, the handle 31 is rotated down and accepted in a cavity under the operation panel 33 to take a sitting position substantially parallelly aligned with the operation panel 33 so that it never prevents a user from touching buttons or knobs on the operation panel 33 to activate the device 30. Upon removal of the device 30 from the position of the car, the user may pull and raise the handle 31 from the bottom of the panel 33, and may subsequently remove the device 30 from a bracket by function of a releasable locking mechanism shown in FIG. 11 to bring it with him outside the car.

The releasable locking mechanism comprises claws 39 extending from side surfaces of the device 30, and bores 36 formed in the bracket 35 fixed in the interior of the car. The claws 39 resiliently project or retract with respect to the side surfaces of the device 30, and can engage the bores 36 when they expand.

When the rear portion of the device 30 is inserted in the bracket 35 through its aperture 37, the claws 39 are suppressed by opposed inner walls of the bracket 35 into the interior of the device 30, but they expand outwardly when opposed to the bores 36, and engage the bores 36 to fix the device 30 to the bracket 39.

On removal of the device 30 from the bracket 39, an unlocking tool 40 is inserted in a slot 41 formed in the operation panel 34. The unlocking tool 49 urges an unlocking lever 38 provided at the back of the slot 41, and the unlocking lever 38 activates a resilient mechanism (not shown) to push back the claws 39 into the interior of the device 30. In this configuration, if a user raises and pulls the handle 31, he can readily remove the device 30 from the bracket 35.

However, the metal handle is exposed to the exterior of the device also when it is held in its sitting position, and shows that the device is removable. Therefore, unless the user bring it with him when he leaves the car, the prior art removable device is exposed to danger of burglary rather than other devices which cannot be removed easily.

Further, the handle sometimes spoils a well-balanced appearance of the front face of the device 30 including the operation panel on which operation buttons or liquid crystal indicators are disposed as a display.

OBJECT OF THE INVENTION

It is therefore an object of the invention to provide a car electronic device including a handle which, however, is never recognized from the exterior and never spoils the design of the operation panel.

SUMMARY OF THE INVENTION

According to the invention, there is provided a car electronic device comprising:

a device housing removably mounted in position of a car;

an operation panel provided on a front face of said device housing and carrying various operation means disposed thereon;

a first frame member provided along a circumferential margin of said operation panel and having opposite ends at opposite side margins of said operation panel; and a second frame member having opposite ends pivotably supported on said side margins of said operation panel and closely opposed to said opposite ends of said first frame member, said second frame member being pivotable between a sitting position aligned with and appearing as a continuous single member with said first frame member along said circumferential margin of said operation panel and a standing position making a right angle with said operation panel so as to be used as a handle when said device is transported.

BRIEF DESCRIPTION OF THE DRAWINGS

FIG. 5 is a perspective view showing a further supporting configuration of the second frame member;

FIG. 6A is a perspective view of a further arrangement of the first frame member;

FIG. 6B is a cross-sectional view taken along A—A' line of FIG. 6A;

DETAILED DESCRIPTION

Figure 1:
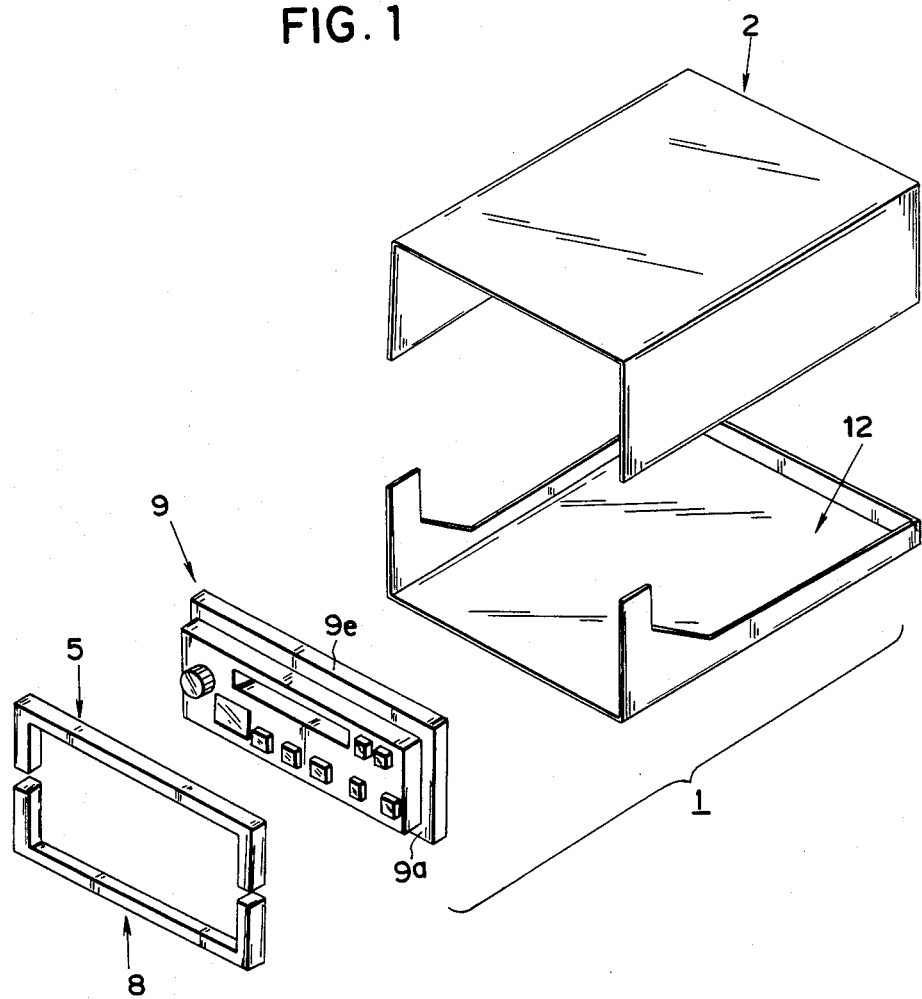
FIG. 1 is a schematic view of a basic arrangement of a car electronic device in which the invention is used.

The invention is described below, referring to an embodiment illustrated in the drawings.

FIG. 1 is a schematic view showing a basic arrangement of a car electronic device related to the present invention.

A car electronic device 1 consists of a hollow housing and an operation panel 9. The housing is defined by an upper case 2 and a lower case 12 and opened at its front end. The operation panel 9 has a rear flange portion 9e to be fixed in the front aperture of the hollow housing.

The operation panel 9 has a front circumferential margin 9a which is slightly smaller than the inner circumferential margin of the hollow device housing defined by the upper case 2 and the lower case 12. Around the front circumferential margin 9a are provided a first frame member 5 and a second frame member 8 in a closely opposed fashion so that the first and second frame members 5 and 8 appear to be a continuous, unitary member when the second frame member 8 is held in its sitting position aligned with the first frame member 5.

Figure 2:
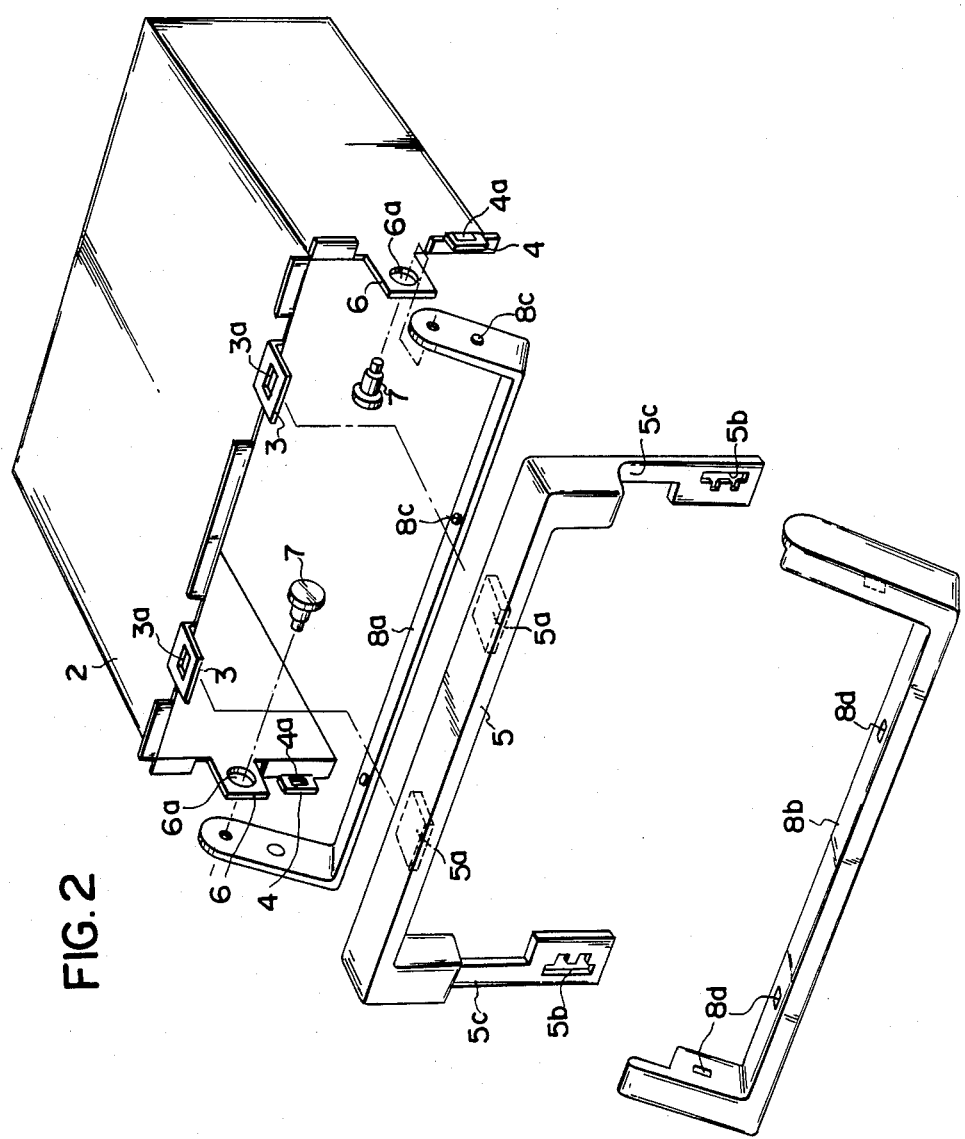
FIG. 2 is an exploded perspective view showing a supporting configuration of a frame member in an embodiment of the invention.
Figure 3:
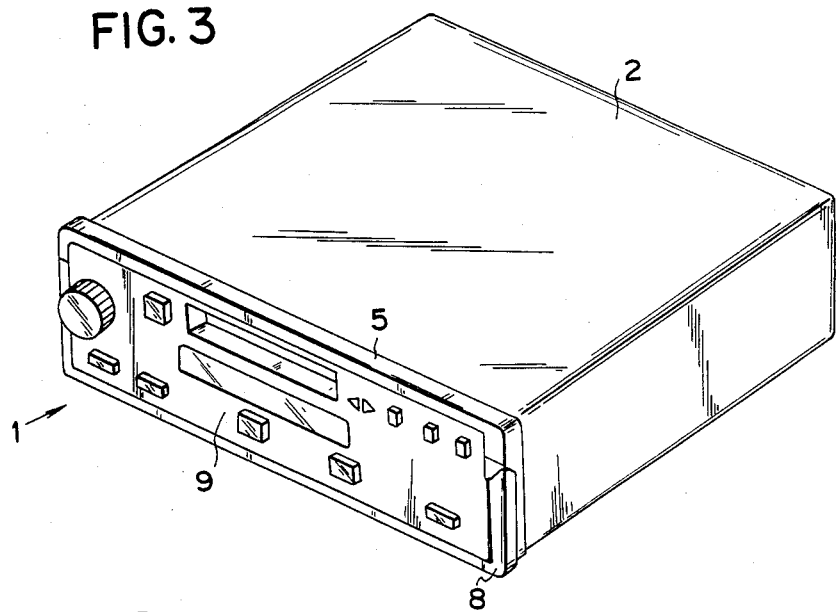
FIG. 3 is a perspective view showing the configuration of the device accepted in a second frame member.

FIG. 2 shows an embodiment in which the first and second frame members are fixed to the upper case 2 of the device housing, and FIG. 3 is a view showing how the second frame member accepts therein the car electronic device 1.

Projections 3 having engage holes 3a are provided along a front upper margin of the upper case 2. Similarly, projections 4 having engage holes 4a are provided at lower portions of front margins of side walls of the upper case 2. The first frame member 5 has cavities 5a and grooves 5b which are engageable with the projections 3 and 4 of the upper case 2, respectively. The first frame member 5 is also provided with offset margins 5c at lower portions of its vertical extensions. However, lower portions of these offset margins 5c need not be provided in some other mounting arrangements of the first frame member 5.

The upper case 2 is further provided with engage projections 6 extending forwardly from its front vertical margins and having shaft holes 6a in which shafts 7 are provided to pivotably support a core member 8a of the second frame member 8 which is made from a self-standing hard material.

The core member 8a has joggle members 8c which engage bores 8d provided in an inner surface of a cover member 8b which is made from plastic resin or rubber to thoroughly cover the core member 8a. The second frame member 8 including the cover member 8b is pivotably linked to the upper case so that its pivotal ends are closely opposed to the offset margins 5c of the first frame member 5. In this fashion, when the second frame member 8 is held in its sitting position parallelly aligned with the first frame member 5, they appear to be a continuous unitary frame member. More specifically, when the second frame member 8 is pivoted down and held in a position aligned with the first frame member 5, their front surfaces make a single plane in all respects including their color, decorative pattern or superficial configuration, so that anyone cannot find at a glance that the first frame member 5 hemming the upper half of the circumferential margin of the operation panel 9 and the second frame member 8 hemming the lower half of same in its sitting position are two separate members.

The second frame member 8 is pivotably supported by the shafts 7 for movement between the above-mentioned sitting position and a standing position making a right angle with respect to the operation panel so as to serve as a handle gripped by a user to remove the car electronic device 1 from a bracket fixed to the car and to carry it with him when he leaves the car. The rotatable angle of the second frame member 8 may be larger or smaller than 90 degrees with respect to the operation panel 9. However, in order to provide the best portable configuration of the car electronic device 1, the second frame member 8 is preferably supported at central portions of both front vertical margins of the device 1 so that the device 1 is hung vertically downwardly from the second frame member 8 when the second frame member 8 is suspended as a handle.

Figure 4:
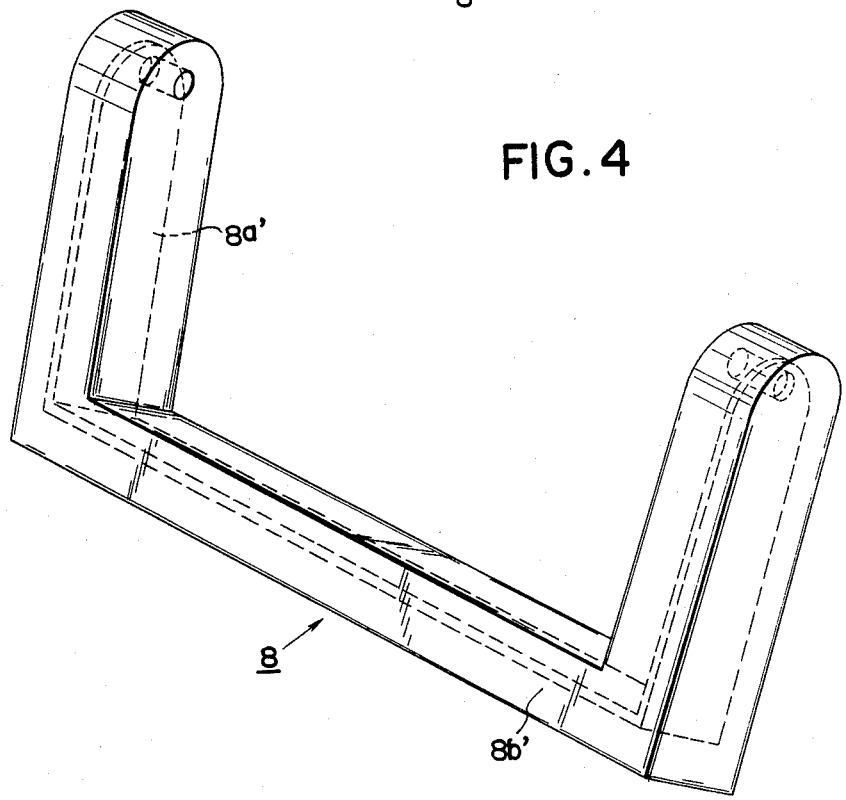
FIG. 4 is a perspective view of a further arrangement of the second frame member.

FIG. 4 shows a different arrangement of the second frame member. In the arrangement of FIG. 2, the second frame member 8 consists of the core member 8a made from a self-standing hard material and the cover member 8b covering the core member 8a. In contrast, the second frame member 8 of FIG. 4 is a single member consisting of a core member 8a' made from a self-standing hard material and coated by a resin layer 8b'. Also in this arrangement, the shafts 7 are not exposed on the outer lateral surfaces of the second frame member 8 so that anyone cannot readily recognize that the second frame member 8 is a pivotable separate member.

FIG. 5 shows a different supporting arrangement of the second frame member. This is different from the arrangement of FIG. 2 in that the second frame member 8 is pivotably supported on the operation panel 9 instead of the upper case 2 which is a part of the device housing.

The operation panel 9 is provided on side walls of its outer peripheral margin 9e with cavities 9c extending forwardly from their rear margins. In the cavities 9c are provided engaging holes 9d. On the other hand, the lower case 12 of the device housing is provided with engage projections 13 which are extensions of both side walls of the lower case 12 for engagement with the cavities 9c. The projections 13 have holes 13a which are aligned with the holes 9d when the projections 13 are accepted in the cavities 9c. By inserting screws 11 in the holes 9d and 13a after fitting the projections 13 in the cavities 9c and overlapping the engage holes 9d and 13a, the operation panel 9 is fixed to the lower case 12.

The operation panel 9 has a front peripheral margin 9a which forms a front half thereof and is offset from the rear peripheral margin 9e. The front peripheral margin 9a is provided in central portions of side walls thereof with engage holes 9b in which shafts 10 are inserted from the interior of the operation panel 9 to pivotably support the second frame member 8 on the operation panel 9.

In most cases, the operation panel 9 is made from plastic resin. However, if the core electronic device 1 is heavy, and the operation panel 9 is not strong enough to bear the above-mentioned arrangement, the operation panel 9 may be made from metal, or alternatively, any hard strengthening members may be attached selected portions of the side walls extending from the cavities 9c to the holes 9b.

FIG. 5 shows a supporting structure using the single-body second frame member 8 of FIG. 4. However, the two-member structure of FIG. 2 may be used in the same supporting arrangement.

The second frame member 8 may be supported on the lower case 12 of the device housing as it is supported on the upper case as shown in FIG. 2 or on the operation panel as shown in FIG. 5. In these supporting structures, the first frame member 5 may be fixed to the operation panel 5 or to the lower case 12, although not shown, in the substantially same manner as it is fixed to the upper case 2 in the illustrated embodiment.

FIG. 6 shows an arrangement in which the first frame member 5 is formed as a unitary body with the operation panel 9. In this drawing, the operation panel 9' and the first frame member 5' are formed in a single body from a uniform material. The operation panel 9' is provided only in its front lower half in the illustration with a front peripheral margin 9a' which is offset from its rear peripheral margin 9e. Further, the operation panel 9' is provided with a groove 14 in the front face thereof to divide the operation surface of the operation panel 9' and the first frame member 5', so that the second frame member 8 mounted along the front peripheral margin 9a' appears to be continuous from the first frame member 5'.

In FIG. 6B, grooves 5a' associated with the projections 3 of the upper case 2 are provided at the back of the first frame member 5'. However, they are not required if the operation panel 9' is fixed to the lower case 12.

In the aforegoing arrangements, the first frame member 5 is provided in the upper half of the operation panel 9 whereas the second frame member 8 has its seat in the lower half of same. However, the invention is not limited to this.

Figure 7:
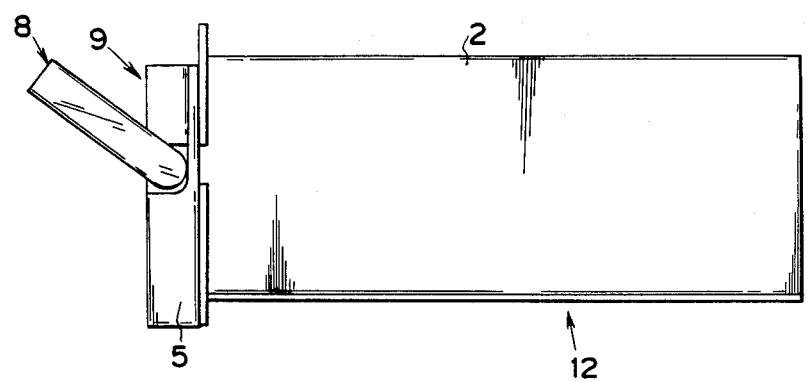
FIG. 7 is a side elevation showing a third assembling configuration of the second frame member.

FIG. 7 shows an arrangement in which the second frame member 8 has its seat in the upper half of the operation panel 9.

Next, a further embodiment of the invention is described below.

Figure 8:
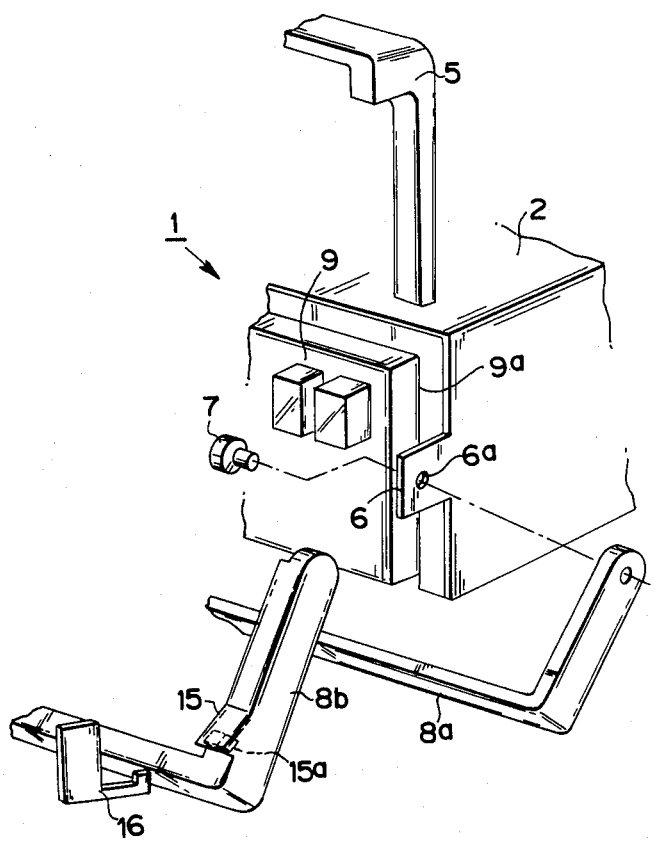
FIG. 8 is a perspective view showing a further embodiment of the invention.

FIG. 8 shows an arrangement of car electronic device 1 in which the second frame member 8 has its seat in the lower half of the operation panel 9. The cover member 8b of the second frame member 8 has a projection 15 defining a frontwardly descending slope on one of its surfaces facing frontwardly when the second frame member 8 is held in its sitting configuration. The projection 15 has an engage hole 15a opening at the bottom thereof in the aligned configuration of the second frame member 8. By inserting a tool 16 in the engage hole 15a and pulling the tool 16 forwardly, the second frame member 8 is readily raised up from its aligned position closely contacting the front peripheral margin 9a of the operation panel 9. This arrangement facilitates a user to manually lift up the second frame member 8 when the gap below the second frame member 8 in its aligned configuration is not large enough to insert his finger. Additionally, since this arrangement employs the engage hole 15a opening at the bottom of the projection 15, it never spoils the design of the front surface of the car electronic device 1. The projection 15 need not be the illustrated triangle configuration, but it may have any other configuration harmonizing the configurations and positions of operation buttons on the operation panel 9 so as to share the total design of the front face of the car electronic device 1.

Figure 9:
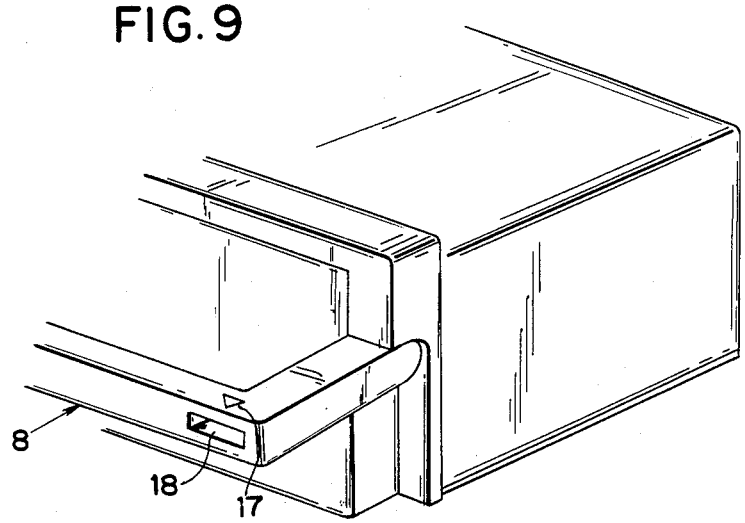
FIG. 9 is a fragmentary enlarged view showing a further arrangement of the second frame member in the further embodiment of the invention.
Figure 10:
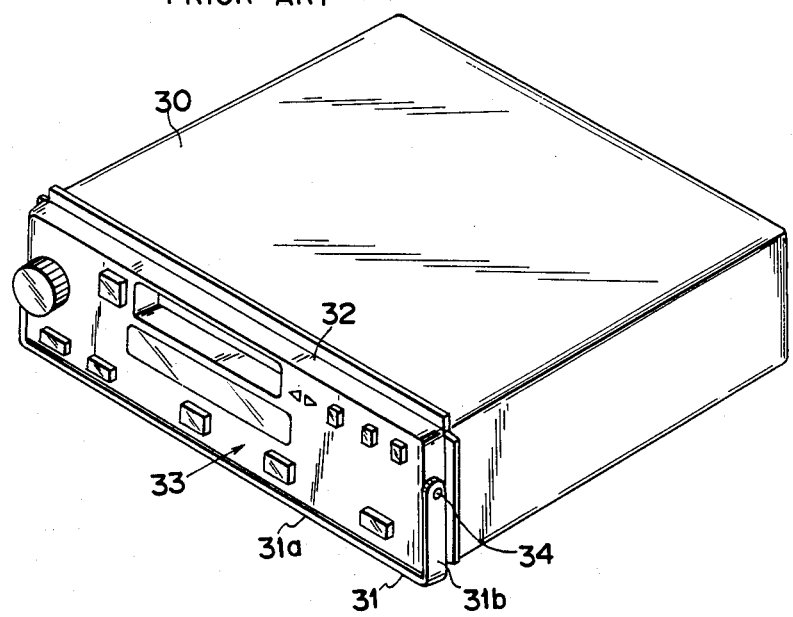
FIG. 10 is a view showing a prior art arrangement.
Figure 11:
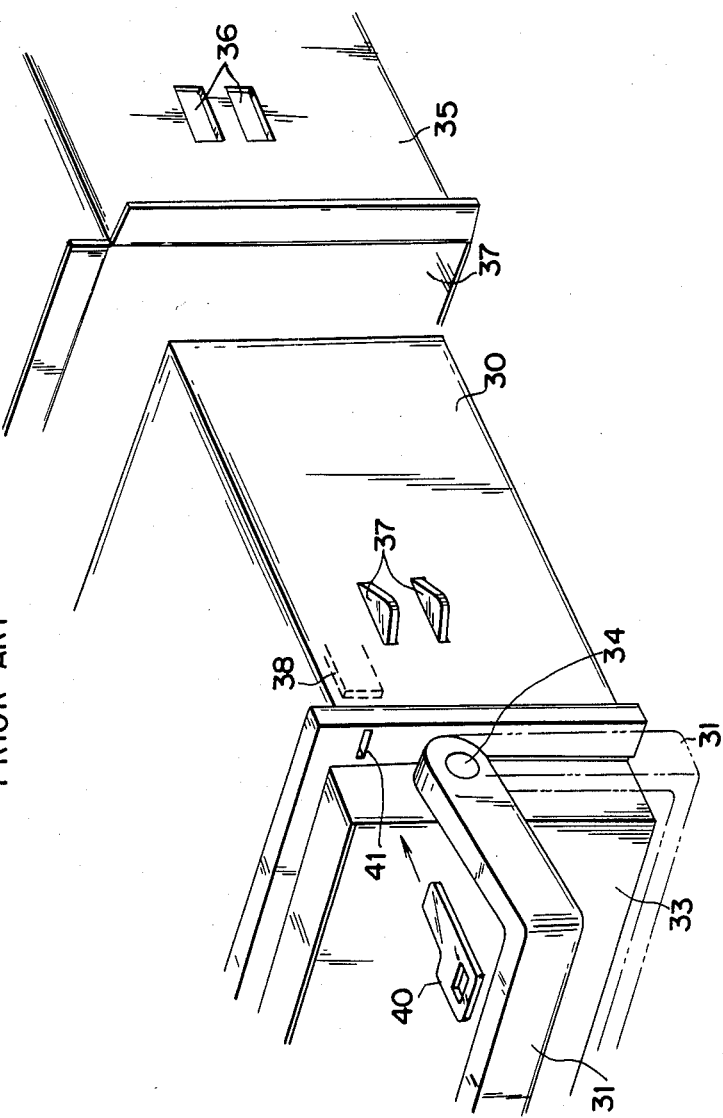
FIG. 11 is a perspective view showing a prior art mounting configuration of a car electronic device with respect to a bracket.

In case that a sufficient gap exists under the second frame member 8 when the car electronic device 1 is mounted in position and the second frame member takes its aligned position, an arrangement shown in FIG. 9 may be employed.

In FIG. 9, an engage hole 18 is provided in the second frame member 8 itself which hole 18 opens at a lower surface 8e of the second frame member 8 in its aligned configuration. In this arrangement, a mark 17 is preferably provided on a front surface 8f of the second frame member 8 in its aligned position to show a user the position of the engage hole 18.

What is claimed is:

1. A car electronic device comprising:
   a device housing removably supported in a position in a car;
   an operation panel provided on a front side of said device housing and having various operation control element supported thereon;
   a first frame member provided along a first portion of a circumferential margin of said operation panel and having opposite ends located at opposite side margins of said operation panel;
   a second frame member having opposite ends pivotably supported in the region of said side margins of said operation panel closely adjacent said opposite ends of said first frame member, said second frame member being pivotable between a sitting position in which it extends along a second portion of said circumferential margin of said operation panel and a standing position in which it extends frontwardly from and at approximately a right angle with respect to said operation panel so as to be used as a handle when said device is removed from said car and transported; and
   means for causing said first and second frame members to visually appear to be a single continuous structural part when said second frame member is in said sitting position.

2. A car electronic device of claim 1 wherein said opposite ends of said second frame member are pivotably supported on said device housing.

3. A car electronic device of claim 1 wherein said opposite ends of said second frame member are pivotably supported on said operation panel.

4. A car electronic device of claim 1 wherein said first frame member is a separate member independent from said operation panel.

5. A car electronic device of claim 1 wherein said first frame member is integrally formed with said operation panel.

6. A car electronic device of claim 1 wherein said opposite ends of said second frame member are pivotably supported on central portions of said side margins of said operation panel.

7. A car electronic device of claim 1 wherein said first and second frame members are disposed so that front surfaces thereon are substantially in a common plane when said second frame member is in said sitting position.

8. A car electronic device of claim 1 wherein said second frame member includes a hard core member having opposite ends which are said pivotably supported ends of said second frame member and includes a cover member covering said hard core member.

9. A car electronic device of claim 1 wherein said second frame member has a single-body arrangement made of a hard core member coated by a resin layer.

10. A car electronic device of claim 1 wherein said second frame member extends along an upper portion of said circumferential margin of said operation panel when in said sitting position.

11. A car electronic device of claim 1 wherein said second frame member extends along a lower portion of said circumferential margin of said operation panel when in said sitting position.

12. A car electronic device of claim 1, wherein said first and second members are each U-shaped members and together form a frame of rectangular shape when said second frame member is in said sitting position.

13. A car electronic device of claim 12 wherein an upper surface of said projection is a sloped surface which is inclined downwardly and frontwardly when said second frame member is in its sitting position.

14. A car electronic device comprising:
a device housing removably in a position in a car;
an operation panel provided on a front side of said device housing and having various operation control elements supported thereon;
a first frame member provided along an upper portion of a circumferential margin of said operation panel and having opposite ends located at opposite side margins of said operation panel;
a second frame member having opposite ends pivotably supported in the region of said side margins of said operation panel closely adjacent said opposite ends of said first frame member, said second frame member being pivotably movable between a sitting position in which it extends along a lower portion of said circumferential margin of said operation panel and a transport position in which it extends frontwardly from and at approximately a right angle with respect to said operation panel so as to be used as a handle when said device is removed from said car and transported;
means for causing said first and second frame members to visually appear to be single continuous structural part when said second frame member is in said sitting position; and
an engaging hole provided in said second frame member and opening downwardly when said second frame member is in said sitting position, wherein a tool can be inserted into said engaging hole to facilitate application of a manual force initiating movement of said second frame member from said sitting position toward said transport position.

15. A car electronic device of claim 14 wherein said second frame member has thereon a projection which projects frontwardly when said second frame member is in its sitting position, and wherein said engaging hole is provided in a surface of said projection which faces downwardly when said second frame member is in its sitting position.

16. A car electronic device of claim 14 wherein said engaging hole is provided in a surface of said second frame member which faces downwardly when said second frame member is in its sitting position.

* * * * *

UNITED STATES PATENT AND TRADEMARK OFFICE
CERTIFICATE OF CORRECTION

PATENT NO. : 4 829 595

DATED : May 9, 1989

INVENTOR(S) : Shigetoshi KOBAYASHI et al

It is certified that error appears in the above-identified patent and that said Letters Patent is hereby corrected as shown below:

Column 8, line 2; after "be" insert ---a---.

Column 7, line 4; after "removably" insert ---supported---.

Signed and Sealed this

Sixteenth Day of January, 1990

Attest:

JEFFREY M. SAMUELS

Attesting Officer

Acting Commissioner of Patents and Trademarks